(12) United States Patent
Mori et al.

(10) Patent No.: US 12,441,948 B2
(45) Date of Patent: Oct. 14, 2025

(54) CARBON MATERIAL AND PRODUCTION METHOD THEREFOR

(71) Applicant: NIPPON STEEL ENGINEERING CO., LTD., Tokyo (JP)

(72) Inventors: Eiichiroh Mori, Tokyo (JP); Kenichi Sekimoto, Tokyo (JP); Suguru Takeda, Tokyo (JP); Yukio Kowaki, Tokyo (JP)

(73) Assignee: NIPPON STEEL ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 19/038,859

(22) Filed: Jan. 28, 2025

(65) Prior Publication Data

US 2025/0171703 A1 May 29, 2025

Related U.S. Application Data

(62) Division of application No. 18/292,792, filed as application No. PCT/IB2022/058753 on Sep. 16, 2022, now Pat. No. 12,281,271.

(51) Int. Cl.
*C10L 5/44* (2006.01)
*C01B 32/05* (2017.01)
*C10B 53/02* (2006.01)

(52) U.S. Cl.
CPC .............. *C10L 5/447* (2013.01); *C01B 32/05* (2017.08); *C10B 53/02* (2013.01); *C10L 2200/0469* (2013.01)

(58) Field of Classification Search
CPC .. C10L 5/447; C10L 2200/0469; C01B 32/05; C10B 53/02
See application file for complete search history.

(56) References Cited

U.S. PATENT DOCUMENTS

| | | |
|---|---|---|
| 5,601,692 A | 2/1997 | Rinker et al. |
| 2009/0217574 A1 | 9/2009 | Coleman et al. |
| 2016/0355744 A1 | 12/2016 | Nakagawa et al. |

FOREIGN PATENT DOCUMENTS

| | | |
|---|---|---|
| AU | 2018378746 A1 | 6/2020 |
| AU | 2019347405 A1 | 7/2020 |
| CN | 108455603 A | 8/2018 |
| CN | 111394112 A | 7/2020 |

(Continued)

OTHER PUBLICATIONS

Mari, Torrefied and carbonized wood, fuel properties and turn of exothermic reaction, Master's Thesis, Department of Forest Sciences, University of Helsinki 2014, pp. 1-77 (Year: 2014).*

(Continued)

*Primary Examiner* — Daniel C. McCracken
(74) *Attorney, Agent, or Firm* — Greer Burns & Crain Ltd.

(57) ABSTRACT

A biomass-derived carbon material is provided, the carbon material having a carbon content of 60 to 75% by weight and an integrated heat of oxidation reaction of 5 kJ/kg or less when maintained in air at 107° C. for 20 minutes. A method for producing a carbon material is provided, the method including: a carbonization step of obtaining biomass chars having a carbon content of 61 to 75% by weight from biomass; and an oxidation step of heating the biomass chars to 200° C. or higher in an atmosphere having an oxygen concentration of 2 to 13% by volume.

2 Claims, 7 Drawing Sheets

(56) References Cited

FOREIGN PATENT DOCUMENTS

| JP | 04224887 A | 8/1992 |
|---|---|---|
| JP | 2002180063 A | 6/2002 |
| JP | 2008049691 A | 3/2008 |
| JP | 2015150520 A | 8/2015 |
| JP | 6402235 B1 | 10/2018 |
| WO | 2020067384 A1 | 4/2020 |

OTHER PUBLICATIONS

Peterson, et al., Oxidation kinetics of biochar from woody and herbaceous biomass, Chemical Engineering Journal 2020; 401: 126043, pp. 1-11 (Year: 2020).*
Mori et al.; U.S. Appl. No. 18/292,792, filed Jan. 26, 2024.
Peterson, et al.; Chemical Engineering Journal 2020; 401: 126043, pp. 1-11 (Year: 2020).

* cited by examiner

CARBON MATERIAL AND PRODUCTION METHOD THEREFOR

CROSS-REFERENCE TO RELATED APPLICATIONS

This application is a divisional of U.S. patent application Ser. No. 18/292,792, filed on Jan. 26, 2024, which is a 35 U.S.C. § 371 national phase application of PCT/IB2022/058753, filed on Sep. 16, 2022, which claims priority to Japanese Patent Application No. 2021-128011, filed on Aug. 4, 2021.

TECHNICAL FIELD

The present disclosure relates to a carbon material and a method for producing the same.

BACKGROUND ART

As a means for reducing $CO_2$ in order to cope with global warming, technology using biomass instead of existing fossil fuels has been developed. Biomass can be utilized as a carbon-neutral fuel by carbonization to increase the heating value. In addition, the biomass can prevent decomposition by organisms by carbonization and fix carbon dioxide for a long period of time by being buried in the ground.

Document 1 proposes a technique for producing a molded fuel by molding a mixture containing a torrefied biomass and a carbonized coal of coal containing at least one of lignite and subbituminous coal. According to this technique, since the molded fuel contains torrefied biomass, the fuel ratio (fuel ratio=fixed carbon (FC)/volatile matter (VM)) can be made smaller than that of the carbonized coal. When the fuel ratio decreases as described above, the volatile matter increases, and therefore, the ignitability is improved. Such a molded fuel becomes porous due to removal of volatile matter immediately after the start of combustion, and has a large specific surface area. As a result, combustion is facilitated and excellent combustibility can be exhibited.

CITATION LIST

Patent Literature

[Patent Document 1] PCT International Publication No. WO2020/067384

SUMMARY OF INVENTION

Technical Problem

When the biomass is carbonized to increase the carbon content, the heating value is improved, but the oxidation reaction by air easily proceeds due to a change in chemical structure caused by thermal decomposition. As a result, spontaneous heat generation is likely to occur and spontaneous ignition may occur. Therefore, in order to prevent heat generation and ignition during storage and transportation, measures more than before are required. Accordingly, the present disclosure provides a carbon material having a high carbon content and sufficiently excellent safety, and a method for producing the same.

Solution to Problem

A method for producing a carbon material according to one aspect of the present disclosure includes: a carbonization step of obtaining biomass chars having a carbon content of 61% by weight or more from biomass; and an oxidation step of heating the biomass chars to 200° C. or higher in an atmosphere having an oxygen concentration of 2 to 13% by volume.

The above-described production method includes the carbonization step of obtaining biomass chars from biomass. By such a carbonization step, it is possible to obtain biomass chars that are less susceptible to decomposition by organisms and have a higher heating value. However, when the carbon content of the biomass chars is high, the biomass chars easily generate heat spontaneously due to an oxidation reaction caused by air. It was found that the spontaneous heat generation phenomenon was particularly significant when the carbon content of the biomass chars was 61% by weight or more. Accordingly, the production method of the present disclosure includes an oxidation step of heating such biomass chars to 200° C. or higher in an atmosphere having an oxygen concentration of 2 to 13% by volume. By including such an oxidation step, active functional groups and the like present on the surface of the biomass chars are oxidized at an appropriate rate, and spontaneous heat generation in the atmosphere becomes less likely to occur. Thus, a carbon material having sufficiently excellent safety can be obtained.

The carbon content of the biomass chars obtained in the carbonization step may be 61 to 75% by weight. Accordingly, the productivity of the carbon material may be improved.

An integrated heat of oxidation reaction when the carbon material obtained in the oxidation step is maintained in air at 107° C. for 20 minutes may be 5 kJ/kg or less. Such a carbon material can sufficiently prevent spontaneous heat generation in the atmosphere. Accordingly, a carbon material having more excellent safety can be obtained.

In the oxidation step, the biomass chars may be heated to a temperature range of 200° C. or higher and lower than 300° C. By heating in such a temperature range, a carbon material having excellent safety can be produced from biomass in a high yield.

In the oxidation step, the time for heating the biomass chars to 200° C. or higher may be 60 minutes or less. Thus, the carbon material can be produced with high productivity. The carbon content of the carbon material may be 60% by weight or more. Accordingly, a carbon material having a sufficiently high heating value can be produced.

In the carbonization step, the biomass may be heated to 320° C. or higher. Accordingly, biomass chars having a carbon content of 61% by weight or more can be produced regardless of the type of biomass. Therefore, the yield of the carbon material may be stably increased.

In the carbonization step, biomass may be carbonized and then fractionated into first biomass chars and second biomass chars having a carbon content lower than that of the first biomass chars. In the oxidation step, the first biomass chars may be heated. Accordingly, only the first biomass that is likely to spontaneously generate heat can be oxidized in the oxidation step. Therefore, the carbon material can be produced with high productivity. The second biomass chars may be mixed with the carbon material obtained in the oxidation step, or may be heated again in the carbonization step.

A carbon material according to an aspect of the present disclosure is a biomass-derived carbon material having a carbon content of 60% by weight or more and an integrated heat of oxidation reaction when maintained in air at 107° C. for 20 minutes is 5 kJ/kg or less. This carbon material has a high carbon content and thus has a high heating value. In addition, since the integrated heat of oxidation reaction when heated in air at 107° C. for 20 minutes is equal to or less than a predetermined value, spontaneous heat generation is prevented. Therefore, the carbon material has a high carbon content and is sufficiently excellent in safety.

The carbon content of the carbon material may be 60 to 75% by weight. Accordingly, the productivity of the carbon material may be improved.

The higher heating value of the carbon material may be 5,500 kcal/kg or more. Such a carbon material can be suitably used as fuel.

Advantageous Effects of Invention

According to the present disclosure, it is possible to provide a carbon material having a high carbon content and sufficiently excellent safety, and a method for producing the same.

DESCRIPTION OF EMBODIMENTS

Figure 1:
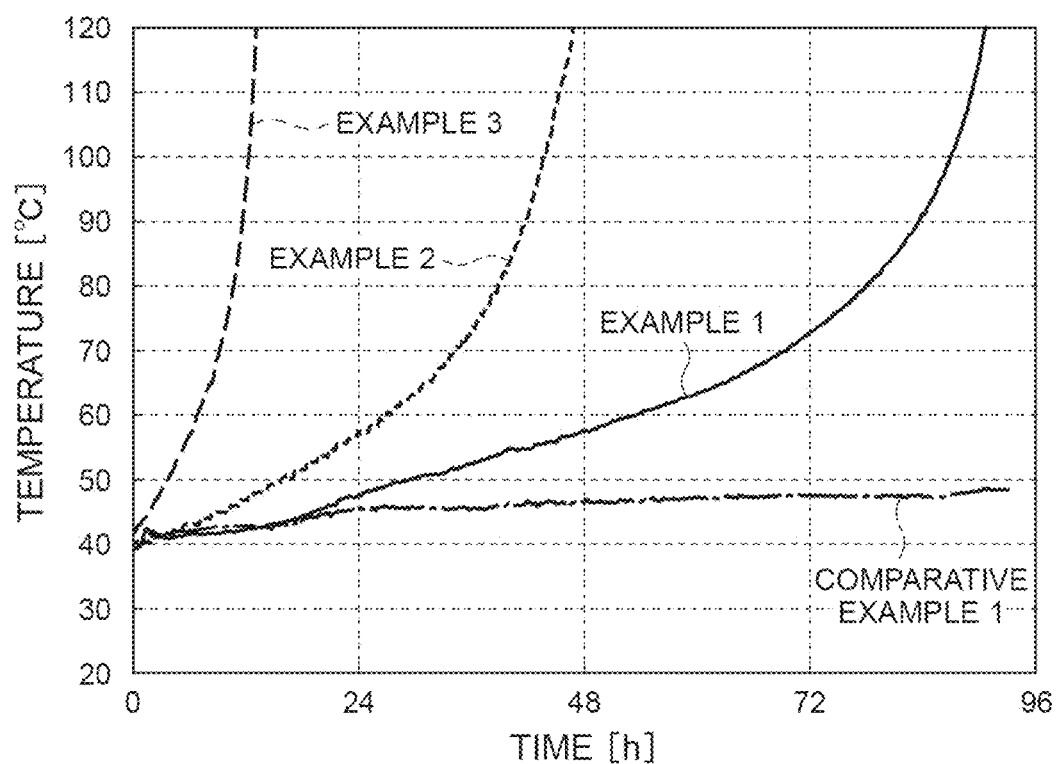
FIG. 1 is a graph showing an evaluation result of spontaneous ignition properties of biomass chars.

Hereinafter, example embodiments of the present disclosure will be described with reference to the accompanying drawings in some cases. The following embodiments are examples for describing the present disclosure, and are not intended to limit the present disclosure to the following contents.

The method for producing a carbon material includes: a carbonization step of obtaining biomass chars from biomass; and an oxidation step of obtaining the carbon material by heating the biomass chars to 200° C. or higher in an oxygen-containing atmosphere.

Biomass in the present specification refers to resources derived from organisms other than fossil fuels. Examples of the biomass include thinned wood, pruned branches, waste materials, bark chips, other woods, bamboo, grass, coconut husk, palm oil residue, vegetables, fruits, food residue, sludge, and the like. The biomass may be wood-based biomass, such as thinned wood, pruned branches, waste materials, bark chips, or other woods. The carbon content of the biomass may be 50% by weight or less. The oxygen content of the biomass may be 40% by weight or more.

The carbon content and oxygen content of biomass, biomass chars and carbon material may be measured using a commercially available analyzer. Specifically, the carbon content can be measured in accordance with JIS M 8819: 1997 "Coal and coke—Mechanical methods for ultimate analysis". The oxygen content can be obtained by the following calculation formula (1) using the carbon content, the hydrogen content, and the nitrogen content measured by the method for ultimate analysis described above, the sulfur content measured by the bomb combustion ion chromatography method, and the measured value of the ash content measured in accordance with JIS M 8812:2006 "Coal and coke—Methods for proximate analysis". Each content value is on a dry basis by weight.

$$\text{Oxygen content (\% by weight)} = \qquad (1)$$
$$100 - (\text{carbon content} + \text{hydrogen content} +$$
$$\text{nitrogen content} + \text{sulfur content} + \text{ash content})$$

The carbonization step may be preceded by a crushing step in which the biomass is crushed. The size of crushing is not particularly limited, but from the viewpoint of improving handling properties in subsequent steps, the mean value of the particle size may be, for example, more than 7 mm, or may be 10 mm or more. On the other hand, from the viewpoint of sufficiently progressing the carbonization in the carbonization step, the mean value of the particle size may be less than 50 mm, or may be less than 40 mm. The average value of the particle sizes is a particle size at which an integrated weight ratio is 50% when crushed pieces of biomass are sieved to measure a particle size distribution. The bulk density of the biomass may be, for example, 0.05 to 0.6 g/cm3. The water content of the biomass may be, for example, 10 to 60% by weight, or may be 30 to 60% by weight.

After the crushing step, a drying step of drying the biomass may be performed. In the drying step, the biomass is dried in air at a temperature range of, for example, 20 to 150° C. The drying step may be performed in an inert gas atmosphere. It may also be carried out in the exhaust gas of a combustion furnace. The drying step may be performed using an ordinary electric furnace or the like, or may be performed using an indirect heater or an air fluidized bed dryer. In the drying step, the water content of the biomass is reduced to, for example, 30% by weight or less. By performing the drying step, carbonization of biomass in the carbonization step can be smoothly progressed. The conditions of the drying step are not particularly limited, and can be adjusted by the water content, size, and the like of the biomass.

In the carbonization step, biomass is carbonized by carbonization to obtain biomass chars. The "biomass chars" in the present disclosure refers to one in which at least a portion of the biomass is carbonized by carbonization. The "biomass chars" may be one in which the biomass is completely carbonized, or a torrefied biomass in which the biomass is not completely carbonized and there is still room for carbonization.

The carbonization step may be performed by heating the biomass to a carbonization temperature of 200° C. or higher in an oxygen-free atmosphere. The ease with which carbonization of biomass proceeds varies depending on the tree species, the site of the tree, and the like. Carbonization may be performed by heating biomass to 250° C. or higher, or may be performed by heating biomass to 320° C. or higher, from the viewpoint of stably and smoothly proceeding carbonization regardless of the tree species of biomass, the site of the tree, and the like. From the viewpoint of increasing the yield of the carbon material, the carbonization step may be performed by heating the biomass to 800° C. or lower, and may be performed by heating the biomass to 500° C. or lower. That is, an example of the carbonization temperature is 200 to 800° C.

In the carbonization step, the time for heating to the above-described temperature range may be 20 minutes or more, or may be 1 hour or more from the viewpoint of sufficiently carbonizing biomass. In the carbonization step, the time for heating to the above-described temperature range may be 3 hours or less, or may be 2 hours or less from the viewpoint of improving the productivity of the carbon material.

The spontaneous heat generation property of biomass chars in the atmosphere depends on the carbon content. That is, when the carbon content is 61% by weight or more, spontaneous heat generation tends to occur in the atmosphere, and spontaneous ignition may occur. Therefore, by oxidizing the biomass having a carbon content of 61% by weight or more in the following oxidation step, the spontaneous heat generation of the biomass-derived carbon material can be prevented.

From the viewpoint of sufficiently increasing the heating value of the carbon material, the carbon content of the biomass chars may be 63% by weight or more, or may be 65% by weight or more. The carbon content of the biomass chars may be 95% by weight or less, and may be 75% by weight or less, from the viewpoint of shortening the carbonization step and improving the productivity of the carbon material. An example of the carbon content of the biomass chars is 61 to 95% by weight.

From the viewpoint of sufficiently increasing the heating value of the carbon material, the heat (integrated value) of oxidation reaction of the biomass chars may be 6 kJ/kg or more, may be 7 kJ/kg or more, or may be 8 kJ/kg or more. The heat (integrated value) of oxidation reaction of the biomass chars may be 40 kJ/kg or less, or may be 30 kJ/kg or less, from the viewpoint of shortening each process and improving the productivity of the carbon material.

The heat (integrated value) of oxidation reaction of the biomass chars and the carbon material in the present specification is an integrated value of the amount of heat generated (on a dry basis) when maintained in air at 107° C. for 20 minutes. The heat (integrated value) of oxidation reaction can be measured using a commercially available TG-DSC apparatus.

When first biomass chars having a high carbon content and second biomass chars having a carbon content lower than that of the first biomass chars are obtained by the carbonization step, the first biomass chars and the second biomass chars may be fractionated, and only the first biomass chars may be subjected to the next oxidation step. Such fractionation may be carried out as part of the carbonization step or as a fractionation step. As described above, it is possible to efficiently manufacture a carbon material having high safety by performing the oxidation step only on the biomass chars which are likely to generate heat spontaneously.

The first biomass chars may have a carbon content of 61% by weight or more, 63% by weight or more, or 65% by weight or more. The second biomass chars may be used as a carbon material as it is, or may be used as a raw material of the carbonization step. In this case, in the carbonization step, only the second biomass chars may be subjected to carbonization, or a mixture of the biomass and the second biomass chars may be subjected to carbonization.

Fractionation of biomass chars is not limited to fractionation into two, but may be fractionation into three or more in accordance with carbon content. In this case, only the biomass chars having the highest carbon content among the fractionated biomass chars may be subjected to the following oxidation step, or only the biomass chars having the lowest carbon content may not be subjected to the following oxidation step.

In the oxidation step, the biomass chars described above are heated to 200° C. or higher in an oxygen-containing atmosphere. As a result, active functional groups and the like present on the surface of the biomass chars can be oxidized, and spontaneous heat generation in the atmosphere can be prevented. The oxygen concentration in the oxygen-containing atmosphere may be 2 to 13% by volume, 3 to 10% by volume, or 4 to 8% by volume from the viewpoint of safety and efficiency of the oxidation treatment. By setting the oxygen concentration in such a range, a carbon material having high safety can be smoothly produced while preventing rapid oxidation of the biomass chars. As the oxygen-containing atmosphere, exhaust gas of a combustion furnace may be used. The term "% by volume" of the oxygen concentration refers to a volume fraction under standard conditions (25° C., 100 kPa).

The heating temperature in the oxidation step may be 220° C. or higher, or may be 240° C. or higher, from the viewpoint of improving the productivity of the carbon material. However, if the heating temperature is too high, oxidation of the carbon material proceeds too much, and the yield of the carbon material decreases. In order to obtain a carbon material having high safety in a high yield, the heating temperature in the oxidation step may be lower than 300° C., may be 280° C. or lower, or may be 270° C. or lower. The oxidation step may be performed using, for example, an electric furnace.

The heating time at the heating temperature in the oxidation step may be 10 to 60 minutes or may be 15 to 50 minutes from the viewpoint of producing a carbon material having sufficiently high safety with high production efficiency. Through such an oxidation step, a carbon material having high safety may be obtained.

The carbon material obtained in this way is produced using only biomass and does not contain coal. Thus, since the carbon material is derived from biomass, it can be suitably used for various applications as a carbon-neutral material. Examples of uses of the carbon material include fuels, soil conditioners (biochar), and iron-making PCI coal (blast furnace pulverized coal injection).

The heat (integrated value) of oxidation reaction of the carbon material may be equal to or less than 5 kJ/kg, equal to or less than 4 kJ/kg, or equal to or less than 3 kJ/kg from the viewpoint of sufficiently increasing safety. The heat (integrated value) of oxidation reaction of the carbon material may be 1 kJ/kg or more, or may be 2 kJ/kg or more, from the viewpoint of improving usability as a fuel. When the heat (integrated values) of oxidation reactions of the biomass chars and the carbon material are H0 and H1, respectively, H1/H0 may be 0.1 to 0.5, or may be 0.2 to 0.4.

Since the carbon material is obtained through a carbonization step, the carbon material has a high heating value. The heating value may be, for example, 5,000 kcal/kg or more, or may be 5,500 kcal/kg or more. Such a carbon material can be suitably used as fuel. The heating value in the present disclosure is the higher heating value measured on a dry basis.

The carbon material contains carbon as a main component. From the viewpoint of sufficiently increasing the heating value, the carbon content of the carbon material may be 60% by weight or more, 62% by weight or more, or 64% by weight or more. From the viewpoint of improving productivity, the carbon content of the carbon material may be 80% by weight or less, 75% by weight or less, or 71% by weight or less. An example of the carbon content of the carbon material is 60 to 80% by weight. The carbon material may contain oxygen, nitrogen, hydrogen, and sulfur in addition to carbon. The oxygen content of the carbon material may be, for example, 25% by weight or more, or may be 30% by weight or more. From the viewpoint of sufficiently increasing the heating value, the oxygen content of the carbon material may be less than 40% by weight, less than 38% by weight, or less than 36% by weight.

Although example embodiments of the present disclosure have been described above, the present disclosure is not limited to the above-described embodiments.

EXAMPLE

The content of the present disclosure will be described in more detail with reference to experimental results.

Biomass Carbonization Step (1)

Eucalyptus chips (particle size: 10 to 50 mm, water content: 20% by weight) were prepared as biomass. The biomass was heated in an oxygen-free atmosphere in an electric furnace at a carbonization temperature shown in Table 1 for 2 hours to obtain five kinds of biomass chars having different carbon contents. The biomass before carbonization and the biomass chars obtained by carbonization at each carbonization temperature were subjected to proximate analysis and ultimate analysis, and the higher heating value was measured. The proximate analysis was performed in accordance with JIS M 8812:2006 "Coal and coke—Methods for proximate analysis". The ultimate analysis was performed in accordance with JIS M 8819:1997 "Coal and coke—Mechanical methods for ultimate analysis". The sulfur content was measured by bomb combustion-ion chromatography. The oxygen content was obtained by the above calculation formula (1). The results are shown in Table 1. Each measurement result is a value on a dry basis.

thermal insulation test was performed using a thermostatic bath. Biomass chars (2200 g) were placed as a sample in a thermostatic chamber, and changes in temperature over time were examined under air flow (25 L/min).

In this simulated heat insulation test, the heat insulation state was simulated by raising the set temperature of the thermostatic chamber so as to follow the temperature rise of the sample. That is, the state of the central portion of a deposit when a large amount of biomass chars was piled up and stored in a yard was simulated. Specifically, when the temperature of the sample placed in the thermostatic chamber increased from 40° C. to 41° C., the set temperature in the thermostatic chamber was changed from 40° C. to 41° C. Similarly, when the temperature of the sample increased from 41° C. to 42° C., the set temperature in the thermostatic chamber was changed from 41° C. to 42° C. The change with time of the temperature of the sample when such an operation was intermittently repeated was examined. The results were as shown in FIG. 1. As shown in FIG. 1, the biomass chars of Examples 1, 2, and 3 having a carbon content of 61.0% by weight or more generated heat to 120° C. or higher within 96 hours. These were judged to have spontaneously ignited because the temperature of the biomass chars rapidly increased.

Measurement of Heat (Integrated Value) of Oxidation Reaction of Biomass Chars

The heat of oxidation reactions (dry basis) of the biomass chars of Comparative Example 1 and Examples 1, 2, and 3 among the biomass chars in Table 1 were measured using a TG-DSC test apparatus (manufactured by NETZSCH, STA449F3). In the measurement, each of the biomass chars was crushed and the 10 mg thereof was weighed. The weighed sample was placed in the sample holder of the apparatus, and the temperature was raised from 20° C. to 107° C. at a rate of 3° C./min in a nitrogen-atmosphere (nitrogen-gas flow rate: 100 mL/min). After reaching 107° C., the nitrogen gas was switched to air (flow rate: 100 mL/min). After the switching, the sample was maintained

TABLE 1

|  | Carbonization temperature [° C.] | Proximate analysis | | | Ultimate analysis | | | | | Heating value |
|---|---|---|---|---|---|---|---|---|---|---|
|  |  | Ash [wt %] | VM [wt %] | FC [wt %] | C [wt %] | H [wt %] | N [wt %] | O [wt %] | S [wt %] | HHV [kcal/kg] |
|  | Before dry distillation | 0.7 | 83.0 | 16.3 | 49.6 | 5.9 | 0.0 | 43.8 | 0.0 | 4,640 |
| Comparative Example 1 | 300 | 1.0 | 70.4 | 28.6 | 56.9 | 5.0 | 0.0 | 37.1 | 0.1 | 5,200 |
| Example 1 | 320 | 1.1 | 63.1 | 35.7 | 61.0 | 4.7 | 0.0 | 33.1 | 0.1 | 5,580 |
| Example 2 | 330 | 1.3 | 57.6 | 41.1 | 64.2 | 4.5 | 0.0 | 29.9 | 0.1 | 5,920 |
| Example 3 | 350 | 1.5 | 50.8 | 47.7 | 68.0 | 4.3 | 0.0 | 26.1 | 0.1 | 6,350 |
| Example 4 | 360 | 1.7 | 45.7 | 52.6 | 70.4 | 4.1 | 0.1 | 23.7 | 0.1 | 6,630 |

Evaluation of Spontaneous Ignition Property of Biomass Chars

Figure 2:
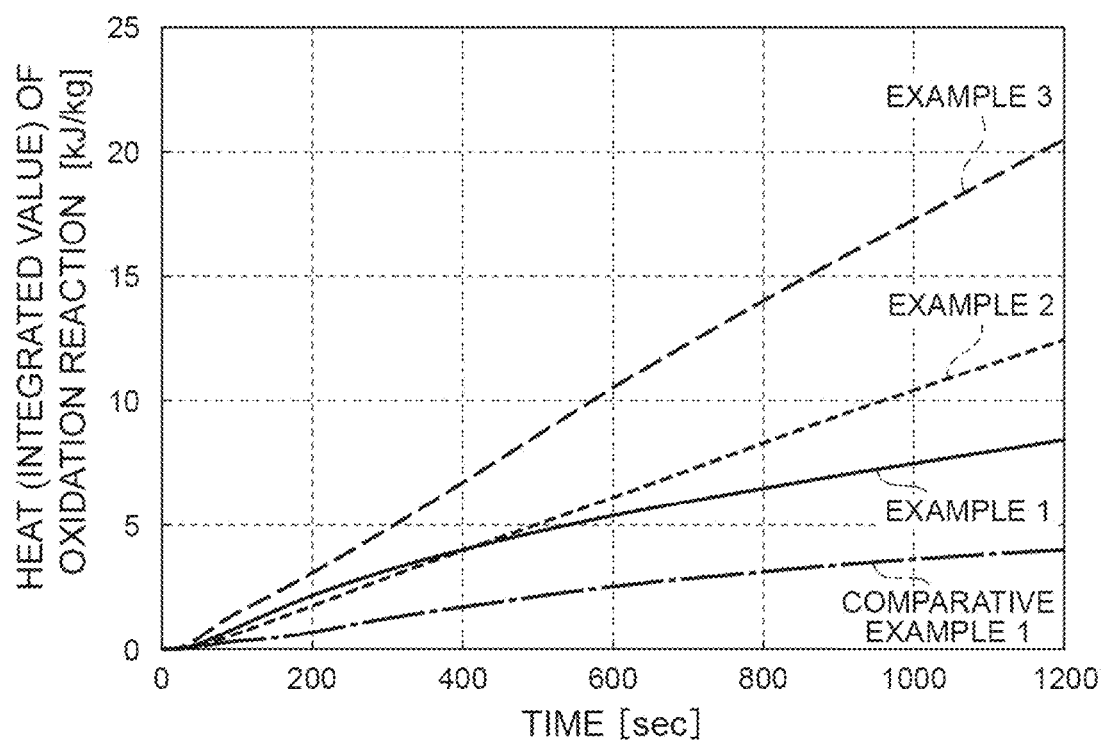
FIG. 2 is a graph showing a measurement result of heat (integrated value) of oxidation reaction of biomass chars.

The heating properties of the biomass chars having carbon contents of 56.9% by weight (Comparative Example 1), 61.0% by weight (Example 1), 64.2% by weight (Example 2), and 68.0% by weight (Example 3) shown in Table 1 were evaluated by a simulated heat insulation test. The simulated for 20 minutes (1200 seconds), and the heat of oxidation reaction during the maintaining was measured. FIG. 2 shows a temporal change of the integrated heat of oxidation reaction. The integrated heat of oxidation reaction until 20 minutes elapsed from the start of the measurement was as shown in Table 2. That is, Table 2 shows heat (integrated values) of oxidation reactions when the biomass chars were maintained at 107° C. for 20 minutes.

TABLE 2

| | Heat (integrated value) of oxidation reaction [kJ/kg] | | |
|---|---|---|---|
| Comparative Example 1 | Example 1 | Example 2 | Example 3 |
| 4.0 | 8.4 | 12.5 | 20.5 |

As shown in FIGS. 1 and 2 and Table 2, it was confirmed that when the carbon content was high, spontaneous ignition and spontaneous heat generation were likely to occur.

Oxidation Step (1)

An oxidation step of oxidizing biomass chars having a carbon content of 70.4% by weight (Example 4) shown in Table 1 at heating temperatures of 180° C., 200° C., 250° C., and 260° C. was performed. The oxidation step was performed using an electric furnace under the condition of an oxygen concentration of 5% by volume. Each heating temperature was maintained for 25 to 90 minutes to prepare a carbon material.

Evaluation of Carbon Material (1)

Figure 3:
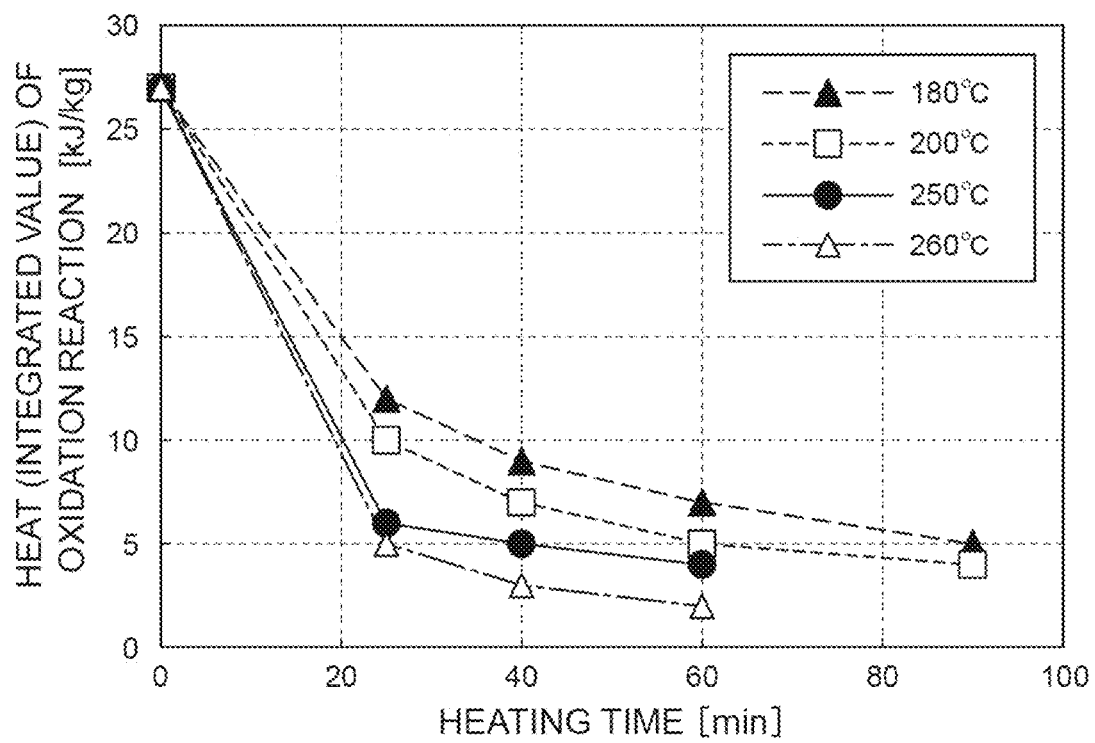
FIG. 3 is a graph showing a relationship between a time of an oxidation step (1) and heat (integrated value) of oxidation reaction.

Heat (integrated value) of oxidation reaction of each carbon material obtained in the oxidation step (1) was obtained. The heat (integrated value) of oxidation reaction of the carbon material was measured by the same method as the method of measuring the heat (integrated value) of oxidation reaction of the biomass chars. The relationship between the heating time of the oxidation step (1) and the heat (integrated value) of oxidation reaction was as shown in FIG. 3. Based on the measurement results of FIG. 3, the heating time in the oxidation step necessary for making the heat (integrated value) of oxidation reaction equal to or less than 5 kJ/kg was obtained. The results are shown in Table 3. The remarks column in Table 3 shows the types of Examples and Comparative Examples.

TABLE 3

| Oxidation step | | |
|---|---|---|
| Heating temperature [° C.] | Heating time [minute] | Remarks |
| 180 | 90 | Comparative Example 2 |
| 200 | 60 | Example 4-1 |
| 250 | 40 | Example 4-2 |
| 260 | 25 | Example 4-3 |

As shown in Table 3, when the heating temperature in the oxidation step was 180° C., it was necessary to set the heating time in the oxidation step to 90 minutes or more in order to set the heat (integrated value) of oxidation reaction to 5 kJ/kg or less (Comparative Example 2). On the other hand, it was confirmed that the heating time in the oxidation step can be set to 60 minutes or less by setting the heating temperature in the oxidation step to 200° C. or higher (Examples 4-1 to 4-3).

Oxidation Step (2)

An oxidation step (2) of oxidizing the biomass chars of Example 2 in Table 1 was performed. In this oxidation step (2), a fluidized bed equipment was used. The biomass chars were oxidized while being fluidized by an oxygen-containing gas (200 to 210° C., oxygen concentration: 8% by volume). The residence time was 30 minutes.

Evaluation of Carbon Material (2)

Figure 4:
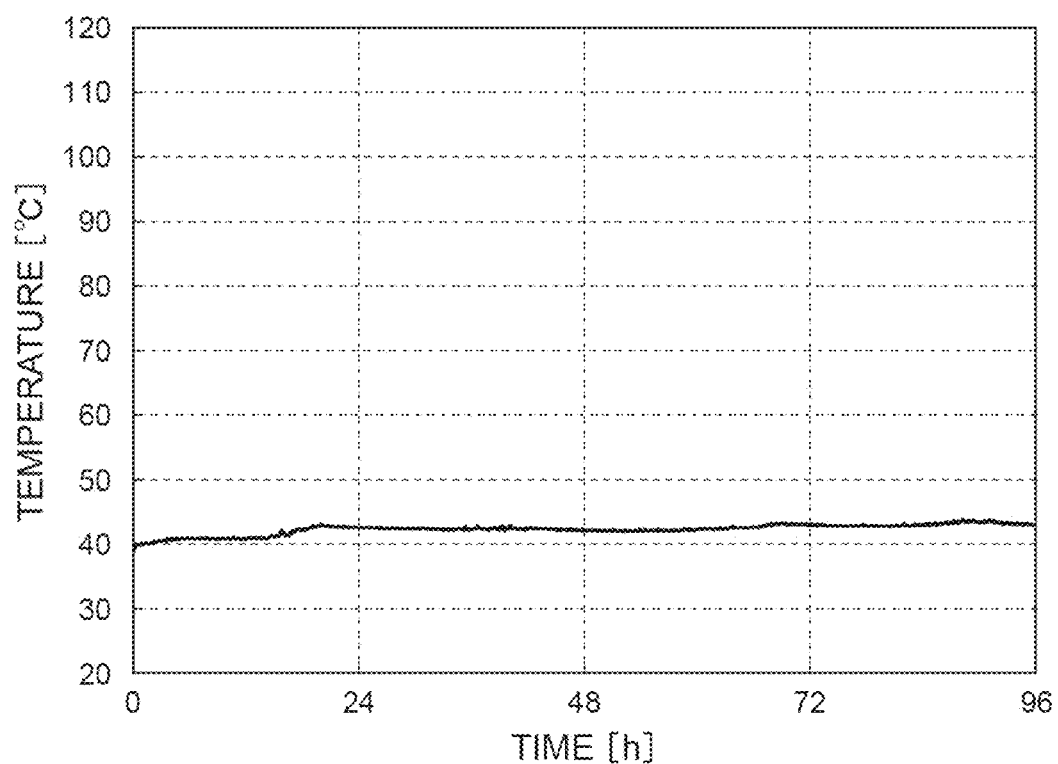
FIG. 4 is a graph showing an evaluation result of the spontaneous ignition property of a carbon material.

The spontaneous ignition property of the carbon material obtained in the oxidation step (2) was evaluated. This evaluation was carried out by the same procedure as in "Evaluation of Spontaneous Ignition Property of Biomass chars" described above. The results are shown in FIG. 4. From the comparison between FIGS. 1 and 4, it was confirmed that the spontaneous ignition property could be sufficiently reduced by the oxidation step (2).

The carbon material was subjected to proximate analysis and ultimate analysis, and the higher heating value was measured. The analysis method was the same as the analysis method of biomass chars in the "Biomass Carbonization Step (1)". The results are shown in Table 4. Each measurement result is a value on a dry basis. Comparing the results of Example 2 of Table 1 and Example 2-1 of Table 4, it was confirmed that the oxygen content was increased by the oxidation step (2). In addition, as the oxygen content increased, the carbon content was relatively decreased.

TABLE 4

| | Proximate analysis | | | Ultimate analysis | | | | | Heating value |
|---|---|---|---|---|---|---|---|---|---|
| | Ash [wt %] | VM [wt %] | FC [wt %] | C [wt %] | H [wt %] | N [wt %] | O [wt %] | S [wt %] | HHV [kcal/kg] |
| Example 2-1 | 1.0 | 61.0 | 38.0 | 61.4 | 4.1 | 0.2 | 33.3 | 0.0 | 5,700 |

Oxidation Step (3)

Carbon materials were prepared by performing the oxidation step (3) of oxidizing the biomass chars of Examples 1, 2, and 4 in Table 1. The oxidation step (3) was performed by heating at 250° C. for 15 to 60 minutes in an atmosphere having an oxygen concentration of 5% by volume using an electric furnace. The carbon materials obtained by oxidizing the biomass chars of Examples 1, 2, 4 were designated as Examples 1-1, 2-2, and 4-4, respectively.

Evaluation of Carbon Material (3)

Figure 5:
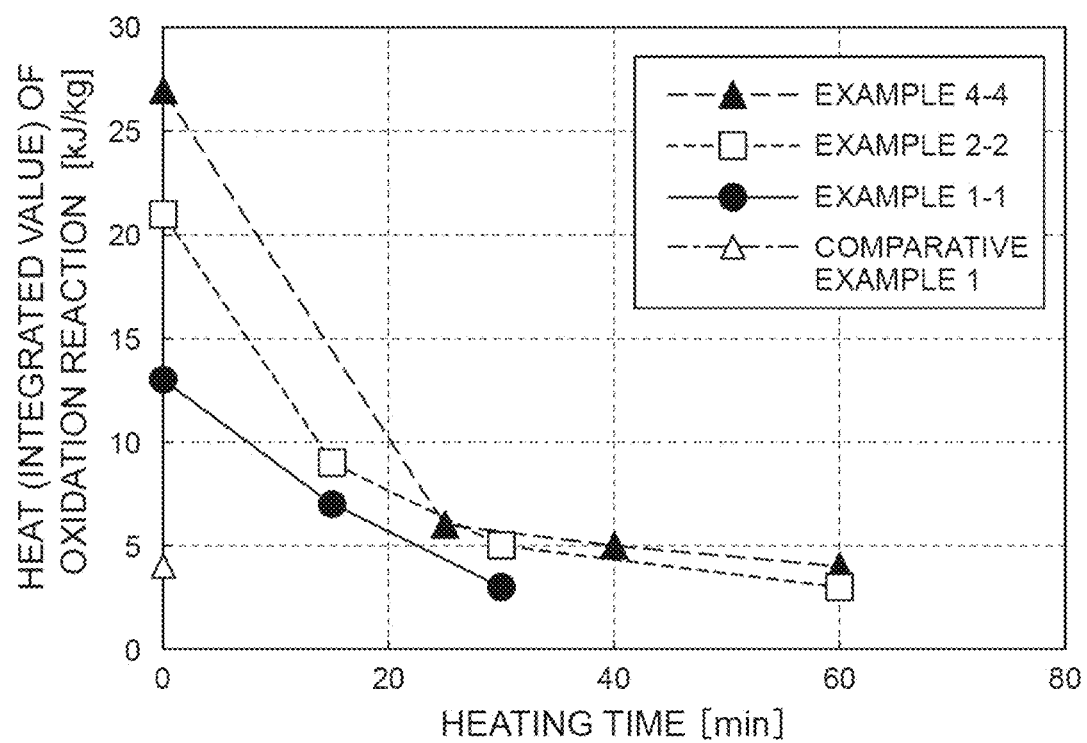
FIG. 5 is a graph showing a relationship between time of an oxidation step (3) and heat (integrated value) of oxidation reaction.

Heat (integrated value) of oxidation reaction of each carbon material obtained in the oxidation step (3) was obtained. The heat of oxidation reaction (dry basis) was measured by the same method as the method for measuring the heat (integrated value) of oxidation reaction of the biomass chars. The relationship between the heating time of the oxidation step (3) and the heat (integrated value) of oxidation reaction was as shown in FIG. 5. Based on the measurement results shown in FIG. 5, the time required for oxidizing treatment to reduce the heat (integrated value) of oxidation reaction to 5 kJ/kg or less was determined. The results are shown in Table 5.

TABLE 5

|  | Carbon content of biomass chars [% by weight] | Heating time in oxidation step [minute] |
|---|---|---|
| Example 1-1 | 61.0 | 23 |
| Example 2-2 | 64.2 | 30 |
| Example 4-4 | 70.4 | 40 |

As shown in Table 5, it was confirmed that the heating time of the oxidation step needs to be increased as the carbon content of the biomass chars increases in order to obtain a carbon material having a reduced heat (integrated value) of oxidation reaction. For comparison, Comparative Example 1 in which the carbon content of biomass chars was 56.9% by volume is also plotted in FIG. 5. In Comparative Example 1, since the heat (integrated value) of oxidation reaction is 5 kJ/kg or less even if the oxidizing treatment is not performed, the oxidizing treatment is not necessary.

Oxidation Step (4)

Figure 6:
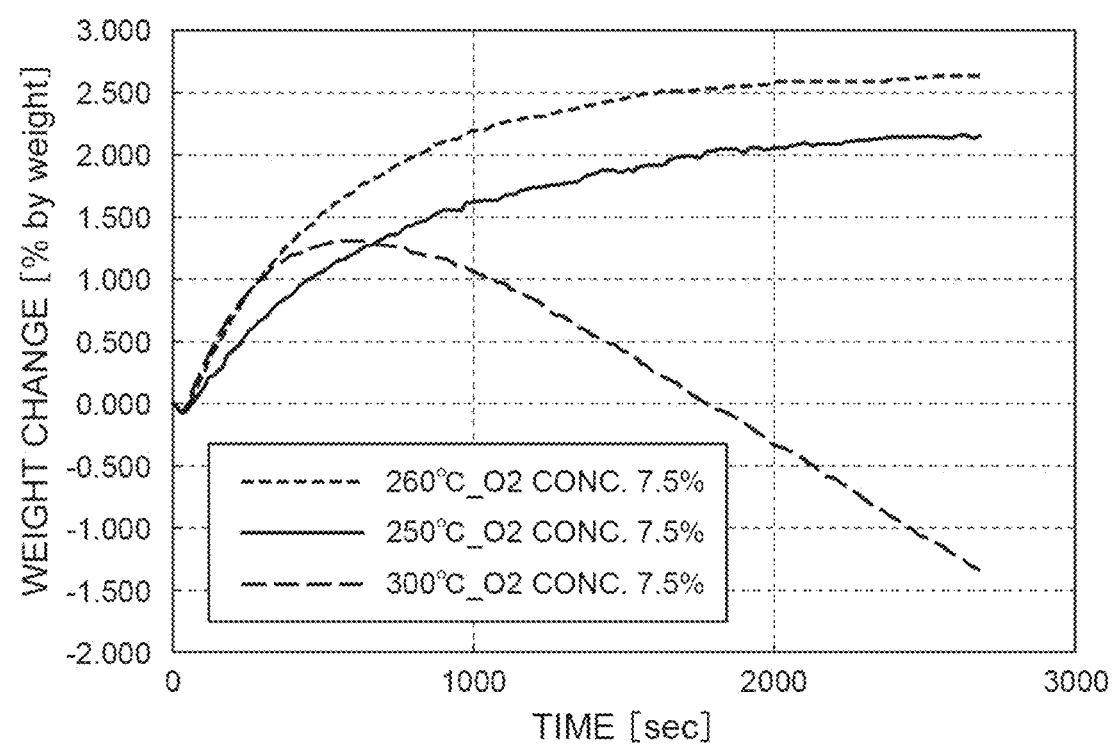
FIG. 6 is a graph showing changes in weight over time in oxidation step (4).

Carbon materials were prepared by performing an oxidation step (4) of oxidizing the biomass chars of Example 4 of Table 1 at each heating temperature of 250° C., 260° C., and 300° C. The oxidation step (4) was performed using a TG-DSC test apparatus (manufactured by NETZSCH, STA449F3) under the condition of an oxygen concentration of 7.5% by volume. The oxidation step (4) was performed at each temperature, and the change in weight over time was measured. The results are shown in FIG. 6. As shown in FIG. 6, it was confirmed that when the temperature of the oxidation step (4) was 300° C. or higher, the decomposition of the biomass chars proceeded and the yield of the carbon material was lowered.

Biomass Carbonization Step (2)

Three types of biomasses A, B, and C were prepared as biomasses (wood). White wood is wood obtained by peeling the bark.
Biomass A: pine (bark)
Biomass B: eucalyptus (white wood)
Biomass C: pine (white wood)
Each of the biomasses A, B, and C was heated for 2 hours in an oxygen-free atmosphere using an electric oven to obtain a plurality of types of biomass chars having different carbon contents. The carbonization was performed at a temperature of 260 to 500° C. (carbonization temperature). Each of resulting biomass chars was subjected to ultimate analysis to determine carbon content (% by weight, dry basis). The results are shown in FIG. 7.

Figure 7:
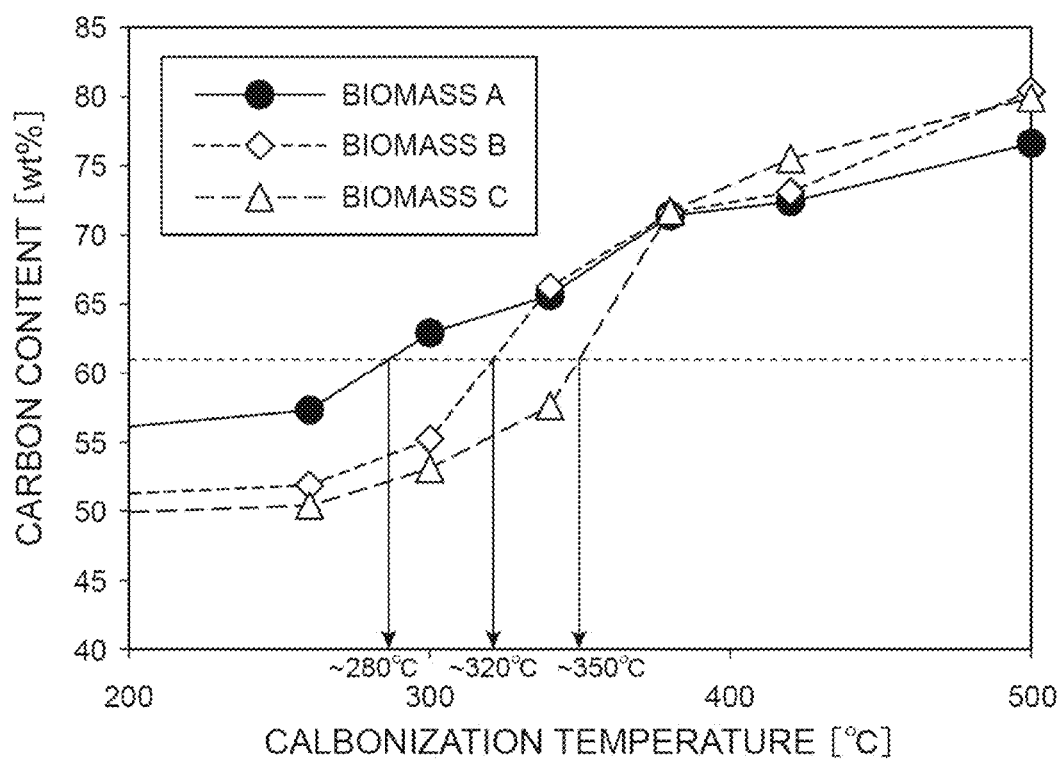
FIG. 7 is a graph showing the relationship between the carbonization temperature and the carbon content of biomass chars in a carbonization step (2).

As shown in FIG. 7, the carbonization temperature at which the carbon content was 61% by weight had a difference of about 70° C. Thus, it was confirmed that the degree of progress of carbonization varies depending on the type of biomass. Therefore, it was confirmed that in order to reduce the variation in the spontaneous ignition property and the spontaneous heat generation property of the carbon material, it is preferable to manage the carbon content of the biomass chars as an index rather than the carbonization conditions such as the carbonization temperature and the carbonization time.

INDUSTRIAL APPLICABILITY

According to the present disclosure, a carbon material having a high carbon content and sufficiently excellent safety and a method for producing the same are provided.

The invention claimed is:

1. A carbon material derived from biomass, the carbon material having:
a carbon content of 60 to 75% by weight,
wherein an integrated heat of oxidation reaction when maintained in air at 107° C. for 20 minutes is 5 KJ/kg or less.

2. The carbon material according to claim 1, having a higher heating value of 5,500 kcal/kg or more.

* * * * *

UNITED STATES PATENT AND TRADEMARK OFFICE
CERTIFICATE OF CORRECTION

| | |
|---|---|
| PATENT NO. | : 12,441,948 B2 |
| APPLICATION NO. | : 19/038859 |
| DATED | : October 14, 2025 |
| INVENTOR(S) | : Eiichiroh Mori et al. |

It is certified that error appears in the above-identified patent and that said Letters Patent is hereby corrected as shown below:

On the Title Page

Add Foreign Application Priority Data item as follows:
--(30) Foreign Application Priority Data Aug. 4, 2021 (JP) .................. 2021-128011--.

Under item "(62) Related U.S. Application Data", delete "Pat. No. 12,281,271" and insert --Pat. No. 12,281,275-- therefor.

Signed and Sealed this
Sixteenth Day of December, 2025

John A. Squires
*Director of the United States Patent and Trademark Office*